United States Patent
Seagle et al.

(10) Patent No.: US 7,211,339 B1
(45) Date of Patent: May 1, 2007

(54) HIGHLY CONDUCTIVE LEAD ADJOINING MR STRIPE AND EXTENDING BEYOND STRIPE HEIGHT AT JUNCTION

(75) Inventors: David J. Seagle, Morgan Hill, CA (US); Marcos M. Lederman, San Francisco, CA (US)

(73) Assignee: Western Digital (Fremont), Inc., Fremont, CA (US)

( * ) Notice: Subject to any disclaimer, the term of this patent is extended or adjusted under 35 U.S.C. 154(b) by 0 days.

(21) Appl. No.: 10/226,398

(22) Filed: Aug. 22, 2002

(51) Int. Cl.
*G11B 5/127* (2006.01)
(52) U.S. Cl. .................. 428/815; 428/816; 360/313
(58) Field of Classification Search ................ 428/611, 428/663, 665, 666, 667, 672, 673, 686, 212, 428/213, 409, 692; 360/110, 313, 324
See application file for complete search history.

(56) References Cited

U.S. PATENT DOCUMENTS

| | | | | |
|---|---|---|---|---|
| 5,680,281 A | * | 10/1997 | Kung et al. | ............... 360/327.2 |
| 5,883,764 A | * | 3/1999 | Pinarbasi | .................... 360/322 |
| 5,946,167 A | * | 8/1999 | Hara et al. | ................... 360/322 |
| 6,256,176 B1 | * | 7/2001 | Mao et al. | ................ 360/324.1 |
| 6,433,971 B1 | * | 8/2002 | Sato et al. | ................... 360/322 |
| 6,587,316 B2 | * | 7/2003 | Hasegawa | ................ 360/324.1 |
| 6,989,972 B1 | * | 1/2006 | Stoev et al. | ................ 360/322 |
| 2001/0004306 A1 | * | 6/2001 | Lee et al. | .................... 360/244 |
| 2001/0004797 A1 | * | 6/2001 | Hsiao | ....................... 29/603.07 |
| 2001/0033462 A1 | * | 10/2001 | Sato | ........................... 360/320 |
| 2002/0097536 A1 | * | 7/2002 | Komuro et al. | .......... 360/324.2 |
| 2003/0046807 A1 | * | 3/2003 | Dimitrov et al. | ........ 29/603.12 |

OTHER PUBLICATIONS

Smithsonian Physical Tables (9th Revised Edition), 2003, pp. 384-394.*

* cited by examiner

*Primary Examiner*—Kevin M. Bernatz
(74) *Attorney, Agent, or Firm*—Strategic Patent Group

(57) ABSTRACT

Magnetoresistive (MR) sensors are disclosed that have leads with reduced resistance, improving the signal-to-noise ratio of the sensors. The leads have broad layers of highly conductive material for connection to MR structures, as opposed to thin wires of highly conductive material or broad layers of resistive material, lowering the resistance of the leads. The low-resistance leads can be formed without increasing the shield-to-shield spacing, providing highly sensitive and focused MR sensors.

10 Claims, 3 Drawing Sheets

HIGHLY CONDUCTIVE LEAD ADJOINING MR STRIPE AND EXTENDING BEYOND STRIPE HEIGHT AT JUNCTION

BACKGROUND

The present invention relates to magnetoresistive (MR) sensing mechanisms, which may for example be employed in information storage systems or measurement and testing systems.

FIG. 1 shows a cutaway top view of a step in the fabrication of a prior art magnetoresistive (MR) sensor that may for example be used in a head of a disk drive. One or more MR layers 20 that vary in resistance in response to an applied magnetic field have been formed on a wafer, and then coated with a mask that has two openings separated by a small space where a MR sensor layers 20 will remain. After ion beam etching (IBE) that removes the MR layers 20 in the openings, metal bias and lead layers are deposited on the mask and openings, the mask and the metal layers atop it are removed by chemical etching, and the leads 22 remain covering the bias layers. The metal bias layer may be made of a hard magnet such as cobalt that has relatively high resistivity. The lead layer 22 may be made of a physically hard but somewhat resistive material such as tantalum or chromium, or may be a highly conductive material such as gold, which is capped with a tantalum or chromium adhesion layer. The MR layers 20 that remain between the leads 22 will define the track width of the sensor, which may be less than one micron.

FIG. 2 shows a step subsequent to that shown in FIG. 1, the subsequent step defining a height of the sensor, sometimes called the stripe height. A second mask has been created that substantially covers the lead layers 22 as well as covering part of the MR layers 20 disposed between the lead layers. An IBE is then performed that removes the MR layers 20 in areas not covered by the mask, leaving the MR layers 20 only in small region between the leads 22, and removing part of the leads 22 that are not covered by the mask, as shown by dashed outline 25 of the original leads.

For the situation in which the leads are made of a physically soft material such as gold, the dashed outline 25 may represent an edge of a hard bias layer that is exposed after the gold has been milled away by IBE. For the case in which the leads are formed of physically hard materials such as tantalum or chromium, outline 25 may represent remnants of the lead layer. In either case the region outside the unmilled leads 22 and within dashed line 25 consists of material having relatively high resistivity. Later, after additional layers have been formed, the wafer will be cut and polished to line 27, leaving MR sensor 30 connected between the leads 22 that have not been removed by IBE.

FIG. 3 shows an opened up view of the sensor 30 after lapping or polishing of surface 27. Leads 22 can be seen to have long strips 33 that are connected to the sensor 30. The scale of FIG. 3 is magnified compared to that of FIG. 2, displaying the rounding of the leads 22 where the strips connect to larger lead section, the rounding due to limitations in photolithography. Similar limitations prevent the length of the strips, which may each be about one micron, from being shortened without introducing error or imperfections in defining the height of the sensor.

Even for the case in which the leads 22 are made of gold, the small cross sectional area and long length of the strips 33 causes measurable resistance. Since the MR sensor 30 measures a change in resistance, the lead resistance lowers the signal-to-noise ratio of the sensor. For the situation in which the leads are made of tantalum or chromium, this parasitic resistance may be worse.

FIG. 4 shows a view of surface 27 of the completed prior art sensing device of FIG. 3. The MR structure is shown generally at 30 and the leads are shown generally at 22, each being composed of plural layers in this example. A first magnetically soft shield layer 50 has been formed of permalloy, followed by a dielectric read gap layer 52 made of alumina. An antiferromagnetic (AF) layer 55 has been formed on the read gap layer 52, followed by a permalloy pinned layer 58, so that the AF) layer 55 fixes the magnetic direction of the pinned layer 58. A spacer layer 60 has been formed of copper on the pinned layer 58, and a permalloy sense layer 62 has been formed on the spacer layer 60.

A mask was formed atop the sense layer 62, as described with reference to FIG. 1 above, and MR structure 30 defined by milling that extends slightly into the first read gap layer 52. With the mask still present a seed layer 64 of chromium was formed to a thickness of 50 Å, followed by a 600 Å cobalt-based layer 66 that provides magnetic bias to edges of the free, layer 55. A 100 Å tantalum adhesion layer 68 is disposed on the bias layer 66, and a 600 Å gold lead layer 70 formed on the adhesion layer 68. A 100 Å tantalum capping layer 72 was deposited on the gold layer 70, after which the mask was chemically removed, lifting off the metal layers that were formed atop the mask, and a second dielectric read gap layer 75 made of alumina is deposited. For the situation in which metal layers such as bias and lead layers are thickly deposited, the metal layers may completely envelope the mask in an area over the MR sensor 30. The metal coated mask can then be broken off, for example by ultrasonic agitation of an etchant, but this can leave metal fences protruding above the edges of the sensor 30.

A second magnetically soft shield layer 77 has been formed of permalloy atop the read gap layer 75. The shield layers 50 and 77 help to shield the MR structure 30 from magnetic flux originating from parts of a magnetized media track that are not substantially aligned with MR structure 30, allowing the MR structure 30 to more clearly sense the flux from bits that are aligned with MR structure 30. The spacing between shield layers 50 and 77 determines the focus of the MR structure 30 on the magnetic flux emanating from the media directly opposite the MR structure 30, by eliminating magnetic flux that emanates from bits that are not aligned with MR structure 30. For reading high density magnetic patterns it is therefore advantageous to reduce the thickness of the various layers between the shield layers 50 and 77, limiting the thickness of the leads 22. If read gap layer 52 is made too thin, however, lead or stripe etching may create a short circuit to shield layer 50. If read gap layer 75 is made too thin, metal fences protruding above edges of sensor 30 may create a short circuit to shield layer 77. Stated differently, the leads 22 may have a total thickness of about 800 Å, and the MR sensor 30 layers may have a combined thickness of about 500 Å, so that the lead thickness and bias layer thickness can be limiting factors in shield-to-shield spacing.

SUMMARY

Magnetoresistive (MR) sensors are disclosed that have leads with reduced resistance, improving the signal-to-noise ratio of the sensors. The leads have broad layers of highly conductive material for connection to MR structures, as opposed to thin wires of highly conductive material or broad layers of resistive material, lowering the resistance of the leads. The low-resistance leads can be formed without increasing the shield-to-shield spacing, providing highly sensitive and focused MR sensors. The broad layers of highly conductive lead material also conduct heat away from the sensors, which can further improve sensor performance and lifetime.

In one embodiment, a device is disclosed comprising: a solid body having a surface; a magnetoresistive structure disposed in said body adjacent to said surface, said magnetoresistive structure extending a first amount in a first direction that is substantially parallel to said surface, extending a second amount in a second direction that is substantially perpendicular to said surface, and extending a third amount in a third direction that is perpendicular to said first and second directions, with said third amount being less than each of said first and second amounts; a first lead layer disposed in said body adjacent to said surface and made of material having a resistivity of less than $6 \times 10^{-8}$ $\Omega$m, said first lead layer having a first edge extending in said second direction so that a first portion of said first edge adjoins said magnetoresistive structure and a second portion of said first edge is removed from said magnetoresistive structure; and a second lead layer disposed in said body adjacent to said surface, separated from said first lead layer in said first direction and made of material having a resistivity of less than $6 \times 10^{-8}$ $\Omega$m at room temperature, said second lead layer having a second edge extending in said second direction so that a first part of said second edge adjoins said magnetoresistive structure and a second part of said second edge is removed from said magnetoresistive structure; wherein said first portion is separated from said first part by a distance that is substantially identical to that separating said second portion from said second part.

In one embodiment, a device is disclosed comprising: a solid body having a surface; a magnetoresistive structure disposed in said body adjacent to said surface, said magnetoresistive structure extending a first amount in a first direction that is substantially parallel to said surface, extending a second amount in a second direction that is substantially perpendicular to said surface, and extending a third amount in a third direction that is perpendicular to said first and second directions, with said first amount and said second amount each being greater than said third amount; and a lead layer disposed in said body adjacent to said surface and having an edge adjoining said magnetoresistive structure, said edge extending a fourth amount in said second direction without extending as much as said second amount in said first direction, said lead layer including gold, copper, silver, aluminum, beryllium, magnesium, molybdenum or tungsten; wherein said fourth amount is significantly greater than said second amount.

In one embodiment, a device is disclosed comprising: a solid body having a surface; a magnetoresistive structure disposed in said body adjacent to said surface, said magnetoresistive structure extending a first amount in a first direction that is substantially parallel to said surface, extending a second amount in a second direction that is substantially perpendicular to said surface, and extending a third amount in a third direction that is perpendicular to said first and second directions, with said first amount and said second amount each being greater than said third amount; and a lead layer disposed in said body adjacent to said surface and extending a fourth amount in said third direction, said lead layer having an edge adjoining said magnetoresistive structure and extending a fifth amount in said second direction without extending as much as said second amount in said first direction, made of material having an electrical resistivity of less than $6 \times 10^{-8}$ $\Omega$m at room temperature; wherein said fifth amount is at least two orders of magnitude greater than said fourth amount.

DETAILED DESCRIPTION OF THE PREFERRED EMBODIMENTS

Figure 5:
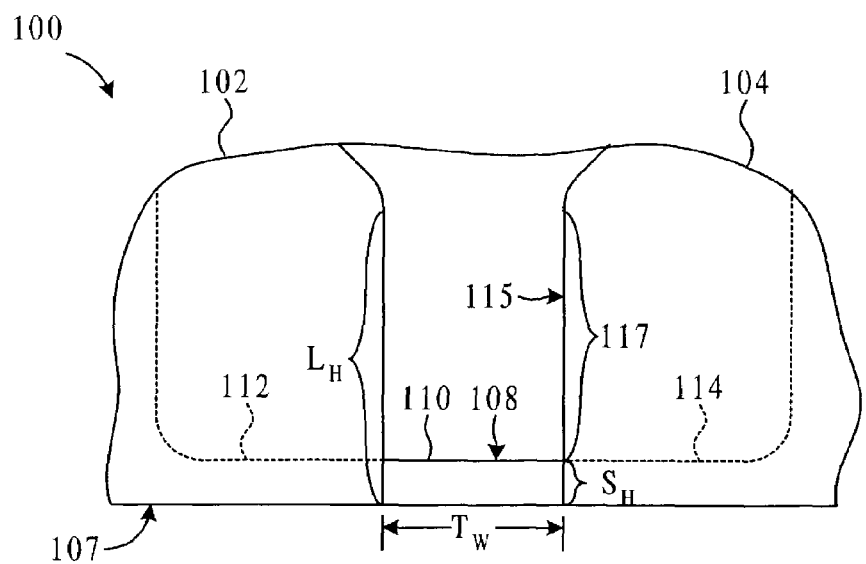
FIG. 5 shows an opened up view of an embodiment of a sensing device having low-resistance leads.

FIG. 5 shows an opened up view of an embodiment of a sensing device 100 having low-resistance leads 102 and 104 connected to a MR structure 110. A polished surface 107 defines a bottom edge or sensing side of the MR structure 110, after a top edge 108 of the MR structure 110 has been defined by masking and removal by IBE or similar processes. Portions of the leads 102 and 104 were also trimmed by the removal process, as shown by dashed lines 112 and 114, respectively, but the removal process was terminated after the MR structure 110 was completed and before the highly conductive leads had been removed.

Instead of the prior art approach of having thin leads connected to an MR sensor, the embodiment of FIG. 5 has a lead height $L_H$ that is significantly greater than a MR structure height $S_H$. The greater conductive cross-section provided by the greater lead height $L_H$ reduces the lead resistance, making any change in the MR structure 110 resistance more noticeable, increasing the sensitivity of the sensing device 100. The lead height $L_H$ in this embodiment is also greater than a track-width $T_W$ of the MR structure 110, emphasizing the series resistance of the MR structure over the parallel resistance of the leads 102 and 104.

A surprising way to provide the increase in a highly conductive lead cross-section is by reducing the thickness of the highly conductive portion of the lead. This reduced thickness of the highly conductive portion of the lead affords an increased thickness of a physically hard capping layer of the lead, without decreasing the resolution of the sensor by increasing the shield-to-shield spacing. The increased thickness of the hard capping layer in turn allows an IBE that penetrates the sensor layers to define a stripe height $S_H$ without penetrating the capping layer, leaving the physically soft but highly conductive portion of the lead intact.

Each of the leads 102 and 104 has an edge extending substantially perpendicular to surface 107 further than the stripe height $S_H$. For instance, lead 104 has an edge 115 with a first portion adjoining the magnetoresistive structure and a second portion 117 removed from the magnetoresistive structure. The broad layers of highly conductive lead material also conduct heat away from the sensors, which can further improve sensor performance and lifetime.

Figure 6:
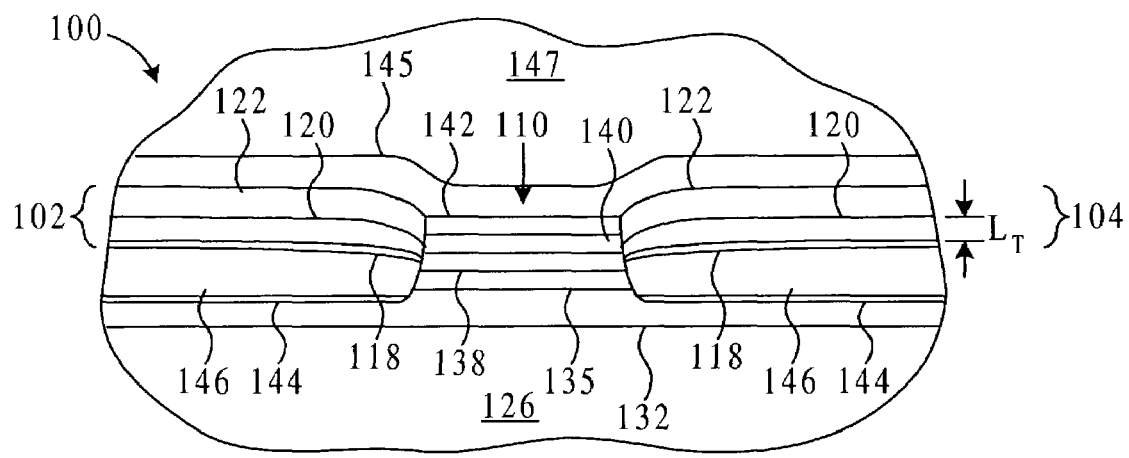
FIG. 6 shows a view of the surface of the completed sensing device of FIG. 5.

FIG. 6 shows a view of the surface 107 of the completed sensing device 100 of FIG. 5, having leads 102 and 104 connected to a MR structure 110. A thin coating of dielectric material such as alumina or diamond-like carbon (DLC) may coat the surface 107 to protect the sensing device 100, with the sensing device elements visible through the coating. Leads 102 and 104 include a tantalum adhesion layer 118 having a thickness of 50 Å, a gold lead layer 120 having a thickness of only 400 Å formed on the adhesion layer 118 and a tantalum cover layer 122 having a thickness of 250 Å. Thus the leads 102 and 104 in this embodiment have the same overall thickness as those of the prior art, but the tantalum cover layer 122 is more than twice as thick. Tantalum has a milling rate that is less than half the overall milling rate of the MR layers, which currently have an overall thickness of about 300 Å, so that the stripe height of the MR structure 110 can be defined by directed etching that does not penetrate the cover layer 122, leaving the gold layer 120 intact.

To complete the description of the embodiment shown in FIG. 6, a first magnetically soft shield layer 126 has been formed of permalloy, followed by a dielectric read gap layer 132 made of alumina. An antiferromagnetic (AF) layer 135 has been formed of permalloy on the read gap layer 132, and a pinned layer 138 has been formed of permalloy or other magnetic materials on the AF layer, the AF layer pinning the magnetic direction of the pinned layer. A spacer layer 140 of copper or other highly conductive materials has been formed on the pinned layer 138. A free layer or sense layer 142 has been formed of permalloy or other magnetic materials on the spacer layer 140.

Figure 1:
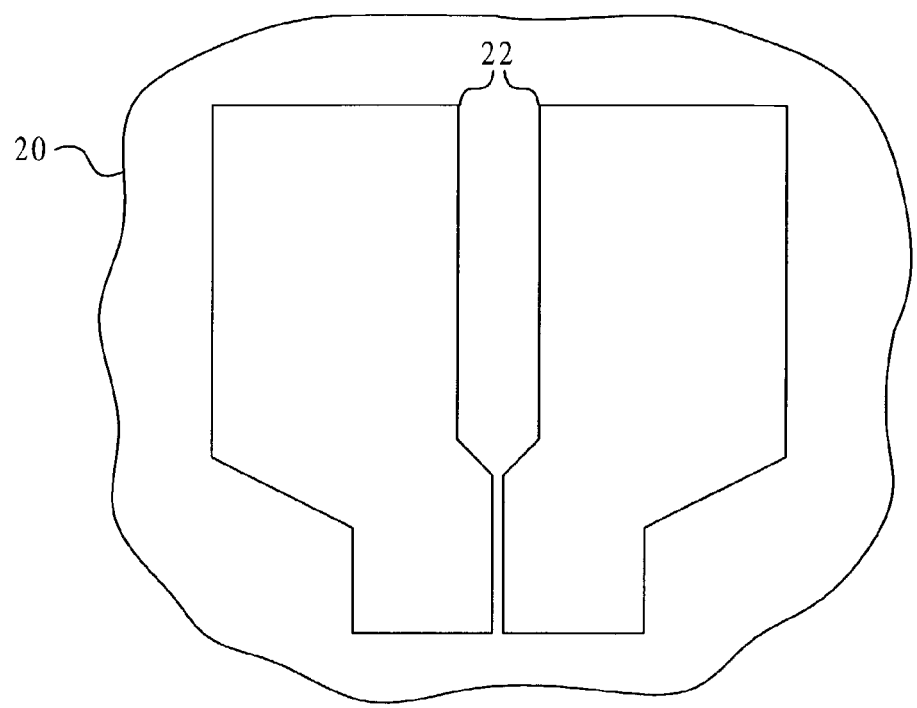
FIG. 1 shows a cutaway top view of a step in the fabrication of a prior art magnetoresistive (MR) sensor that may for example be used in a head of a disk drive.
Figure 2:
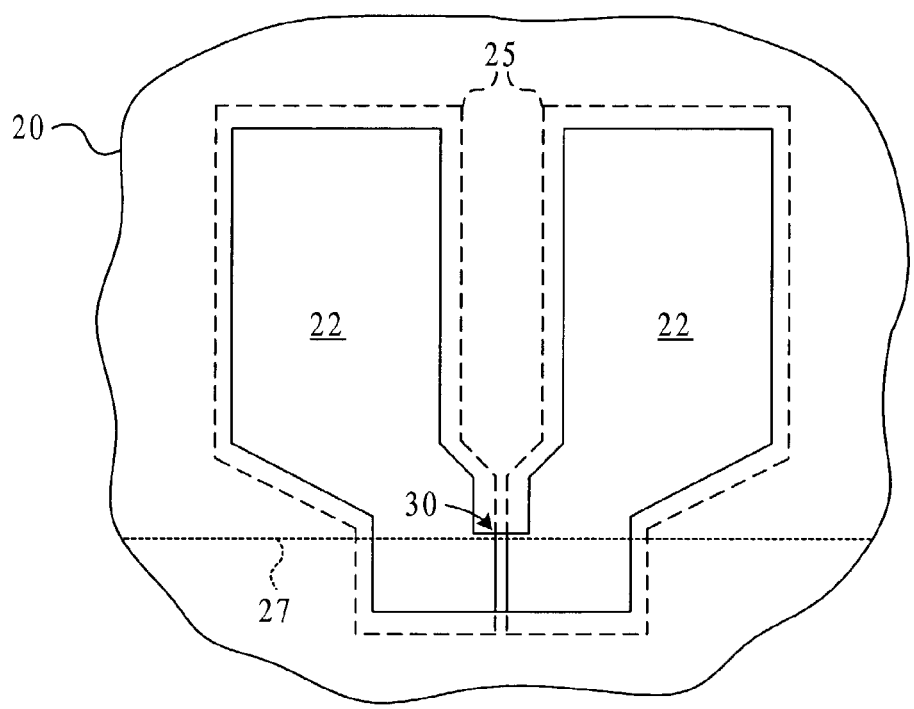
FIG. 2 shows a cutaway top view of a step subsequent to that shown in FIG. 1, the subsequent step defining a height of the MR sensor.
Figure 3:
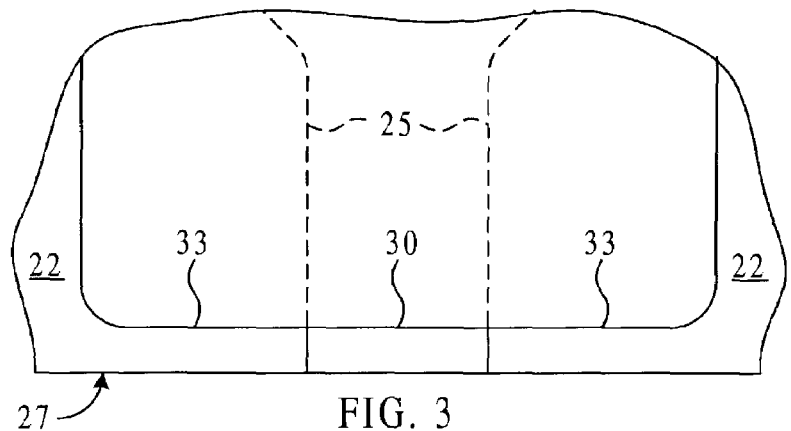
FIG. 3 shows an opened up view of the prior art sensor after additional layers have been formed and the wafer cut and polished.
Figure 4:
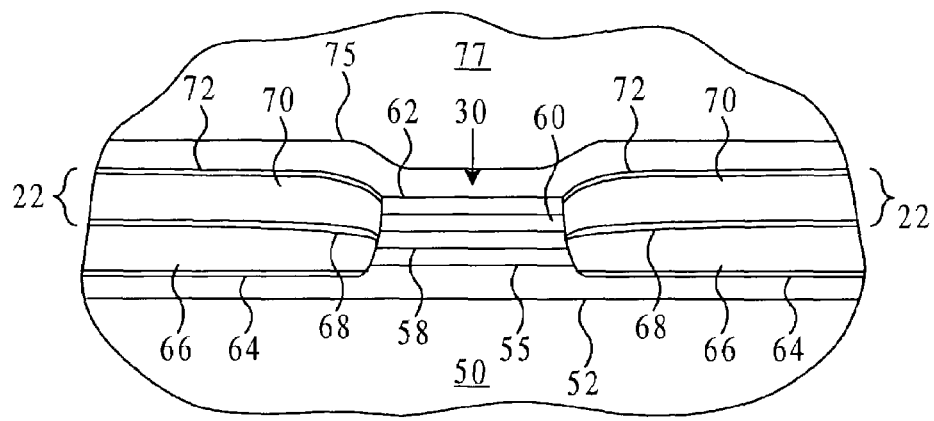
FIG. 4 shows a view of surface 27 of the completed prior art sensor of FIG. 3.

A mask was formed atop the sense layer 142, as described with reference to FIG. 1 above, and MR structure 110 defined by milling that extends slightly into the first read gap layer 132. With the mask still present a seed layer 144 of chromium was formed to a thickness of 50 Å, followed by a 600 Å cobalt-based layer 146 that provides magnetic bias to edges of the free layer 55. The tantalum adhesion layer 118, gold lead layer 120 and the cover layer 122 were deposited as mentioned above. The mask was then chemically removed, lifting off the metal layers that were formed atop the mask, which may in addition be removed by ultrasonic agitation of the etchant, and a second dielectric read gap layer 145 made of alumina was deposited. A second magnetically soft shield layer 147 has been formed of permalloy atop the read gap layer 145.

Although the above-described embodiment has been shown to work well, variations in many of the parameters are possible. For example, the leads may overlap the top of the MR structure 110, effectively narrowing the track width of the MR structure 110 compared to the amount that the sensor layers extend in the track width direction. The pinning and pinned layers of the MR structure may be formed after the free layer, and/or the MR structure may have additional pinned or free layers, or the MR structure may consist of a single sense layer. The pinning structure may include antiferromagnetic material and may include exchange-coupled layers. Use of an antiferromagnetic material for the bias layer may allow the bias layer to be made thinner, allowing the capping layer to be thicker without having the highly conductive lead layer thinner.

Figure 7:
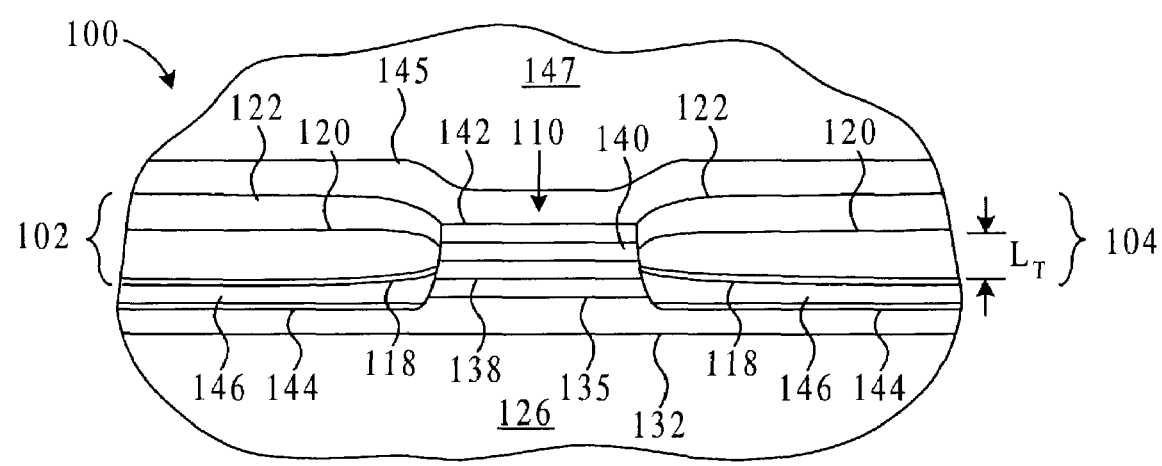
FIG. 7 shows a view of the surface of an alternative completed sensing device of FIG. 5.

FIG. 7 shows an alternative embodiment in which the bias layer 146 is thinner, allowing the capping layer 122 to be thicker without the highly conductive lead 120 to be thinner. The resistance of the leads 102 and 104 is further reduced in this case, further improving the signal-to-noise ratio of the sensing device. The bias layer 146 may be formed with an angled sputtering or other deposition techniques that provide coverage of the MR structure 110 edges despite the reduced bias layer thickness.

The cover layer 122 may be formed of materials selected for physical hardness rather than conductivity. For example, tungsten or chromium can serve as a capping layer and are at least as hard as tantalum. Moreover, the cover layer 122 may be formed of α-tantalum, which has a body-centered cubic crystalline structure, instead of conventional β-tantalum, increasing conductivity as well as hardness, by first forming a chromium seed for the capping layer. The cover layer 122 may be formed of an adhesive layer and a hard layer, such as a tantalum layer covered by a DLC, SiC, Aln or $Al_2o_3$ layer, in which the exposed hard layer is removed during stripe-defining etching, leaving the adhesive layer covering the highly conductive layer. The thickness of the cover layer may be chosen to be almost completely removed during stripe-defining etching, so that the thickness of the highly conductive layer can be increased.

The highly conductive leads may be made of gold, copper, silver, aluminum, beryllium, magnesium, molybdenum, tungsten or other materials known for electrical conductivity. The lead height $L_H$ may be in a range between slightly greater than the MR structure height $S_H$ to an order of magnitude greater than the MR structure height $S_H$. The highly conductive leads may have a lead height $L_H$ that is more than an order of magnitude greater than their lead thickness $L_T$. A highly conductive lead cross-section $L_X$ may be determined by multiplying the lead thickness $L_T$ by the lead height $L_H$. This may be compared with an active element cross section $MR_X$ of the MR structure 110, which is determined by multiplying the combined thickness of the pinned, free and spacer layers by the MR structure height $S_H$. A ratio of the highly conductive lead cross-section $L_X$ to the active element cross section $MR_X$ may be greater than two orders of magnitude.

The MR structure height $S_H$ may range from less than 100 nm to more than one-quarter micron, and the track-width $T_W$ of the MR structure may range from less than 100 nm to more than one-half micron, although other ranges are possible in the future. The pinned layer 140 and the free layer 135 may each be formed of a nickel-iron alloy or other materials known in the art of MR sensors, and may each have a thickness in a range between less than one nanometer and hundreds of nanometers. The conductive layer 106 may be formed of copper or other materials known in the art, and may have a thickness in a range between less than one nanometer and tens of nanometers.

Although the present disclosure has focused on teaching the preferred embodiments, other embodiments and modifications of this invention will be apparent to persons of ordinary skill in the art in view of these teachings. For example, the sensing device may be part of a magnetic head that includes a write element that may be previously or subsequently formed. Alternatively, the sensing device may be used for measuring or testing for magnetic fields. Therefore, this invention is to be limited only by the following claims, which include all such embodiments and modifications when viewed in conjunction with the above specification and accompanying drawings.

The invention claimed is:

1. A device comprising:
   a solid body having a surface;
   a magnetoresistive structure disposed in said body adjacent to said surface, said magnetoresistive structure extending a first amount in a first direction that is substantially parallel to said surface, extending a second amount in a second direction that is substantially perpendicular to said surface, and extending a third amount in a third direction that is perpendicular to said first and second directions, with said third amount being less than each of said first and second amounts;

a first lead layer disposed in said body adjacent to said surface and made of material having a resistivity of less than $6\times10^{-8}$ Ωm at room temperature, said first lead layer having a first edge extending in said second direction so that a first portion of said first edge adjoins said magnetoresistive structure and a second portion of said first edge is removed from said magnetoresistive structure and adjacent to the first portion, said first portion of said first edge having a first length, said second portion having a second length, the first length and the second length having a combined first and second length greater than the second amount; and a second lead layer disposed in said body adjacent to said surface, separated from said first lead layer in said first direction and made of material having a resistivity of less than $6\times10^{-8}$ Ωm at room temperature, said second lead layer having a second edge extending in said second direction so that a first part of said second edge adjoins said magnetoresistive structure and a second part of said second edge is removed from said magnetoresistive structure and adjacent to the first part, the first part and the second part of the second edge having a combined length greater than the second amount; and first and second metal layers each adjoining the first lead layer, extending along the first portion and having an electrical resistivity greater than $6\times10^{-8}$ Ωm at room temperature, the first metal layer having a thickness in the third direction that is at least about as large as a lead thickness of the first lead layer;

wherein said first portion is separated from said first part by a distance that is substantially identical to that separating said second portion from said second part.

2. The device of claim 1, further comprising first and second ferromagnetic layers disposed adjacent to said magnetoresistive structure, with said magnetoresistive structure and said lead layers disposed between and electrically insulated from said first and second ferromagnetic layers.

3. The device of claim 1, wherein said second portion is substantially parallel to said second part.

4. The device of claim 1, wherein said first and second edges are formed by ion beam etching.

5. A device comprising:

a solid body having a surface;

a magnetoresistive structure disposed in said body adjacent to said surface, said magnetoresistive structure extending a first amount in a first direction that is substantially parallel to said surface, extending a second amount in a second direction that is substantially perpendicular to said surface, and extending a third amount in a third direction that is perpendicular to said first and second directions, with said first amount and said second amount each being greater than said third amount;

a first lead layer disposed in said body adjacent to said surface and having a first edge adjoining said magnetoresistive structure, said first edge extending a fourth amount in the first direction, said first lead layer including at least one of gold, copper, silver, aluminum, beryllium, magnesium, molybdenum and tungsten;

a second lead layer disposed in said body adjacent to said surface and having a second edge adjoining the magnetoresistive structure and extending a fifth amount in the second direction, the second lead layer including at least one of gold, copper, silver, aluminum, beryllium, magnesium, molybdenum and tungsten; and a pair of metal layers, each of the pair of metal layers adjoining the first lead layer, having an electrical resistivity greater than $6\times10^{-8}$ Ωm at room temperature, and extending along the first edge by approximately the fourth amount, at least one of the pair of metal layers having a thickness in the third direction that is at least about as large as a lead thickness of the first lead layer;

wherein said fourth amount and the fifth amount are each greater than said second amount.

6. The device of claim 5, wherein said first lead height is greater than said first amount.

7. The device of claim 5, wherein said magnetoresistive structure and said first lead layer are disposed between and electrically insulated from a pair of ferromagnetic layers.

8. The device of claim 5, wherein the first lead layer has a lead cross section and the magnetoresistive structure has a magnetoresistive structure cross section, and wherein the first lead layer cross section is at least two orders of magnitude greater than the magnetoresistive structure cross section.

9. A device comprising:

a solid body having a surface;

a magnetoresistive structure disposed in said body adjacent to said surface and having a magnetoresistive structure cross section, said magnetoresistive structure extending a first amount in a first direction that is substantially parallel to said surface, extending a second amount in a second direction that is substantially perpendicular to said surface, and extending a third amount in a third direction that is perpendicular to said first and second directions, with said first amount and said second amount each being greater than said third amount;

a first lead layer disposed in said body adjacent to said surface and having a first edge adjoining said magnetoresistive structure, the first edge extending a fourth amount in the second direction, the fourth amount being greater than the second amount, the first lead layer being made of material having an electrical resistivity of less than $6\times10^{-8}$ Ωm at room temperature and having a lead layer cross section;

a second lead having a second lead layer disposed in said body adjacent to said surface and having a second edge adjoining said magnetoresistive structure, the second edge extending a a fifth amount in the second direction, the fifth amount being greater than the second amount, the second lead layer being made of material having an electrical resistivity of less than $6\times10^{-8}$ Ωm at room temperature; and a pair metal layers, each of the pair of metal layers adjoining said first lead layer, having an electrical resistivity greater than $6\times10^{-8}$ Ωm at room temperature, and extending along the first edge by approximately the fourth amount, at least one of the metal layers having a thickness in the third direction that is at least about as large as a lead thickness of the first lead layer;

wherein said lead cross section is at least two orders of magnitude greater than the magnetoresistive structure cross section.

10. The device of claim 9, wherein said magnetoresistive structure and said first lead layer are disposed between and electrically insulated from a pair of ferromagnetic layers.

* * * * *